(12) United States Patent
Rush

(10) Patent No.: US 12,089,529 B2
(45) Date of Patent: Sep. 17, 2024

(54) SYSTEM AND METHOD FOR CONTROLLING CROP UNLOADING TUBE POSITION OF AN AGRICULTURAL HARVESTER

(71) Applicant: CNH Industrial America LLC, New Holland, PA (US)

(72) Inventor: Michael Patrick Rush, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 204 days.

(21) Appl. No.: 17/382,427

(22) Filed: Jul. 22, 2021

(65) Prior Publication Data
US 2023/0027697 A1    Jan. 26, 2023

(51) Int. Cl.
*A01D 43/08* (2006.01)
*A01D 41/12* (2006.01)
(Continued)

(52) U.S. Cl.
CPC ....... *A01D 43/087* (2013.01); *A01D 41/1217* (2013.01); *A01D 43/073* (2013.01);
(Continued)

(58) Field of Classification Search
CPC .............. A01D 43/087; A01D 41/1217; A01D 43/073; G05D 1/0094; G05D 1/024; G05D 1/0257; G05D 1/0293; G05D 2201/0201
See application file for complete search history.

(56) References Cited

U.S. PATENT DOCUMENTS 6,681,551 B1   1/2004  Scheidler et al.
8,241,098 B1   8/2012  Latimer
(Continued)

FOREIGN PATENT DOCUMENTS

DE   112013000938 B4 *  4/2021  ............. A01B 69/00
EA       017169 B1 * 10/2012
(Continued)

OTHER PUBLICATIONS

English translation of DE-112013000938-B4.*
(Continued)

*Primary Examiner* — Anshul Sood
*Assistant Examiner* — Matthew Ho
(74) *Attorney, Agent, or Firm* — Peter K. Zacharias

(57) ABSTRACT

An agricultural harvester includes one or more actuators configured to move a crop unloading tube of the harvester relative to a frame of the harvester. Additionally, the agricultural harvester includes a sensor configured to capture data indicative of a presence of the crop receiving vehicle within a crop unloading zone of the agricultural harvester. Moreover, the agricultural harvester includes a computing system communicatively coupled to the sensor. As such, the computing system configured to determine when the crop receiving vehicle is present within the crop unloading zone based on the data captured by the sensor. In addition, when it is determined that the crop receiving vehicle is present within crop unloading zone, the computing system is configured to control an operation of the one or more actuators such that the crop unloading tube is moved relative to the frame from a current position to a predetermined crop unloading position.

20 Claims, 5 Drawing Sheets

(51) Int. Cl.
*A01D 43/073* (2006.01)
*G05D 1/00* (2006.01)

(52) U.S. Cl.
CPC .......... *G05D 1/0094* (2013.01); *G05D 1/024* (2013.01); *G05D 1/0257* (2013.01); *G05D 1/0293* (2013.01)

(56) References Cited

U.S. PATENT DOCUMENTS

| | | |
|---|---|---|
| 8,398,469 B2 | 3/2013 | Coers et al. |
| 9,119,342 B2 | 9/2015 | Bonefas |
| 9,642,305 B2 | 5/2017 | Nykamp et al. |
| 9,973,710 B2 | 5/2018 | Boydens et al. |
| 10,159,191 B2 | 12/2018 | Andrios |
| 2010/0009731 A1* | 1/2010 | Coers ................. A01D 41/1217 460/149 |
| 2011/0307149 A1* | 12/2011 | Pighi .................... A01D 43/087 700/218 |
| 2013/0096782 A1 | 4/2013 | Good et al. |
| 2016/0286724 A1* | 10/2016 | Duquesne ................. B60P 1/42 |

FOREIGN PATENT DOCUMENTS

| | | |
|---|---|---|
| EP | 3760026 A1 | 1/2021 |
| GB | 2517049 A | 2/2015 |
| WO | 2014116819 A1 | 7/2014 |

OTHER PUBLICATIONS

English translation of EA 017169 B1.*
Extended European Search Report for EP Application No. 22186548.8 dated Dec. 12, 2022 (five pages).

* cited by examiner

SYSTEM AND METHOD FOR CONTROLLING CROP UNLOADING TUBE POSITION OF AN AGRICULTURAL HARVESTER

FIELD OF THE INVENTION

The present disclosure generally relates to agricultural harvesters and, more particularly, to systems and methods for controlling the position of a crop unloading tube of an agricultural harvester.

BACKGROUND OF THE INVENTION

An agricultural harvester is a machine used to harvest and process crops. For instance, a combine harvester may be used to harvest grain crops, such as wheat, oats, rye, barley, corn, soybeans, and flax or linseed. In general, the objective is to complete several processes, which traditionally were distinct, in one pass of the machine over a particular part of the field. In this respect, harvesters are typically equipped with a detachable harvesting implement, such as a header, which cuts and collects the crop from the field. The harvester also includes a crop processing system, which performs various processing operations (e.g., threshing, separating, etc.) on the harvested crop received from the harvesting implement. Furthermore, the harvester includes a crop tank, which receives and stores the harvested crop after processing.

In certain instances, the stored harvested crop is unloaded from the harvester into a nearby crop receiving vehicle. Thus, the harvester generally includes a crop unloading tube through which the processed crops are conveyed from the crop tank to the crop receiving vehicle. When the crop receiving vehicle is positioned within a crop unloading zone adjacent to the harvester, the crop unloading tube may be moved to a crop unloading position to allow the harvested crop to be deposited into a crop receiving chamber of the crop receiving vehicle. In this respect, systems have been developed for controlling the position of the crop unloading tube. While these systems work well, further improvements are needed.

Accordingly, an improved system and method for controlling crop unloading tube position of an agricultural harvester would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural harvester. The agricultural harvester includes a frame and a crop unloading tube coupled to the frame, with the crop unloading tube configured to discharge harvested crop from the agricultural harvester into a crop-receiving vehicle. Furthermore, the agricultural harvester includes one or more actuators configured to move the crop unloading tube relative to the frame. Additionally, the agricultural harvester includes a sensor configured to capture data indicative of a presence of the crop receiving vehicle within a crop unloading zone of the agricultural harvester. Moreover, the agricultural harvester includes a computing system communicatively coupled to the sensor. As such, the computing system configured to determine when the crop receiving vehicle is present within the crop unloading zone based on the data captured by the sensor. In addition, when it is determined that the crop receiving vehicle is present within the crop unloading zone, the computing system is configured to control an operation of the one or more actuators such that the crop unloading tube is moved relative to the frame from a current position to a predetermined crop unloading position.

In another aspect, the present subject matter is directed to a system for controlling crop unloading tube position of an agricultural harvester. The system includes a frame and a crop unloading tube coupled to the frame, with the crop unloading tube configured to discharge harvested crop from the agricultural harvester into a crop-receiving vehicle. Furthermore, the system includes one or more actuators configured to move the crop unloading tube relative to the frame. Additionally, the system includes a sensor configured to capture data indicative of a presence of the crop receiving vehicle within a crop unloading zone of the agricultural harvester. Moreover, the system includes a computing system communicatively coupled to the sensor. As such, the computing system is configured to determine when the crop receiving vehicle is present within the crop unloading zone based on the data captured by the sensor. In addition, when it is determined that the crop receiving vehicle is present within the crop unloading zone, the computing system is configured to control an operation of the one or more actuators such that the crop unloading tube is moved relative to the frame from a current position to a predetermined crop unloading position.

In a further aspect, the present subject matter is directed to a method for controlling crop unloading tube position of an agricultural harvester. The agricultural harvester, in turn, includes a frame, a crop unloading tube, and one or more actuators configured to move the crop unloading tube relative to the frame. The method includes receiving, with a computing system, sensor data indicative of a presence of a crop receiving vehicle within a crop unloading zone of the agricultural harvester. Furthermore, the method includes determining, with the computing system, when the crop receiving vehicle is present within the crop unloading zone based on the received sensor data. Additionally, when the crop receiving vehicle is present within the crop unloading zone, the method includes controlling, with the computing system, an operation of the one or more actuators such that the crop unloading tube is moved relative to the frame from a current position to a predetermined crop unloading position.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
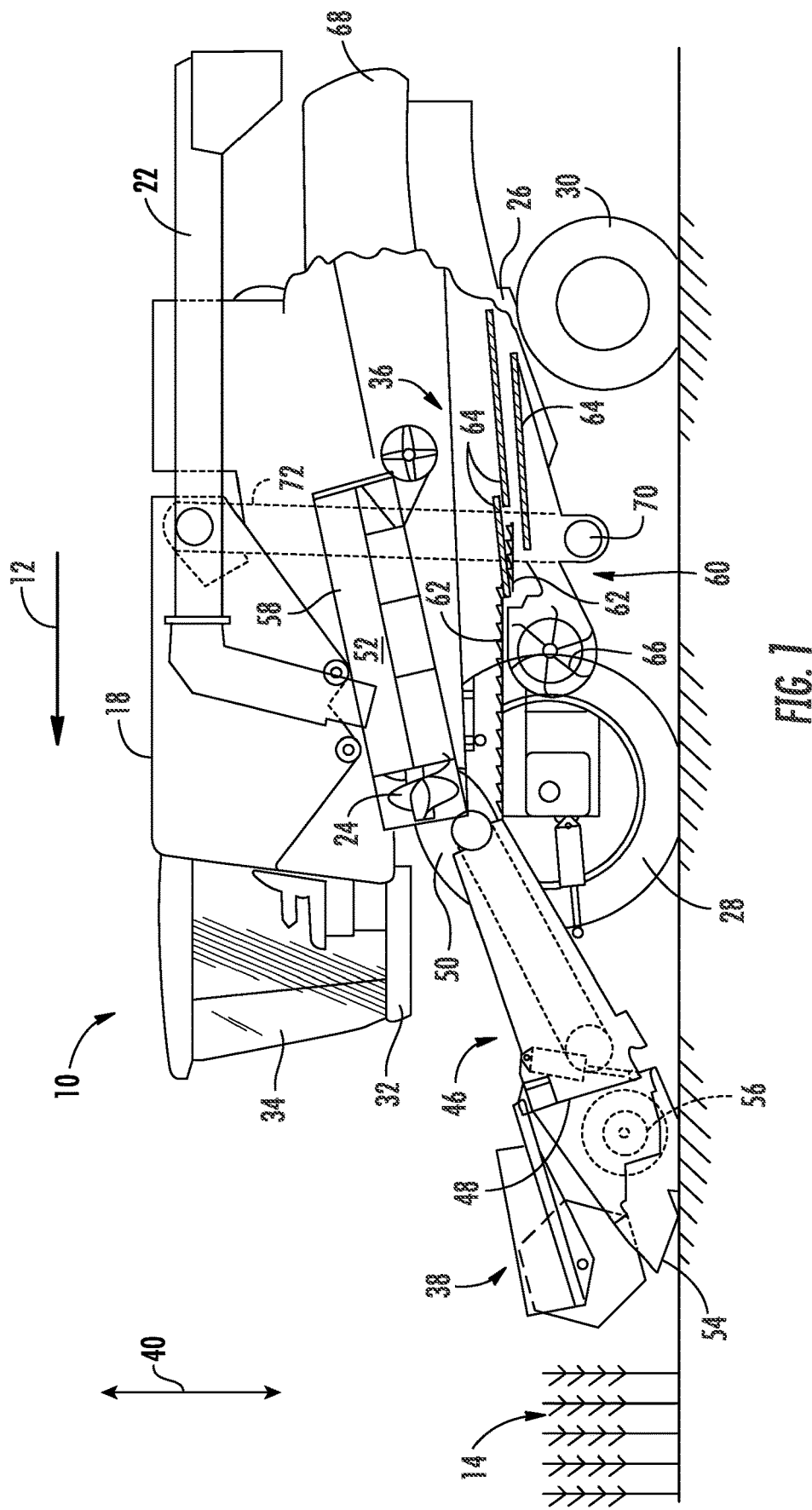
FIG. 1 illustrates a side view of one embodiment of an agricultural harvester in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling crop unloading tube position of an agricultural harvester. As will be described below, the agricultural harvester includes a frame and a crop unloading tube coupled to the frame. The crop unloading tube, in turn, is configured to discharge harvested crop from the harvester into a crop-receiving vehicle (e.g., a crop cart being towed by an agricultural vehicle, such as a tractor). Furthermore, the harvester includes one or more actuators configured to move the crop unloading tube relative to the frame. For example, the actuator(s) may be configured to rotate/swing, raise/lower, and/or extend/retract the crop unloading tube relative to the frame.

In several embodiments, a computing system of the disclosed system is configured to control the position of the crop unloading tube based on data received from a sensor installed on the harvester. The sensor, in turn, is configured to capture data indicative of the presence of the crop receiving vehicle within a crop unloading zone of the harvester. For example, the sensor may correspond to a transceiver-based sensor, such as a RADAR or LIDAR sensor. As such, the computing system may analyze the received sensor data to determine when the crop receiving vehicle is present within the crop unloading zone. In such instances, the computing system may control the operation actuator(s) such that the crop unloading tube is moved relative to the frame from its current position to a predetermined crop unloading position. In some embodiments, the predetermined crop unloading position is selected from a plurality of predetermined crop unloading positions based on one or more characteristics (e.g., type, make, model, etc.) of the crop receiving vehicle. Once the crop unloading tube is at the predetermined crop unloading position, harvested crop can be deposited into a crop receiving chamber of the crop receiving vehicle.

Moving the crop unloading tube to the predetermined crop unloading position when the received sensor data indicates that the crop receiving vehicle is present within the crop unloading zone improves the operation of the harvester. More specifically, many conventional systems rely on the operator to visually identify when the crop receiving vehicle is present within the crop unloading zone and provide an input (e.g., press a button) to move the crop unloading tube. However, it can be difficult to the operator to see when crop receiving vehicle is present within the crop unloading zone. Moreover, such responsibility can be distracting and/or taxing on the operator's focus. Alternatively, some conventional systems rely on the use of complex image processing techniques to identify the location of the crop receiving chamber of the crop receiving vehicle and guide the discharge opening of the crop unloading tube to this location. Such systems, however, require significant computing resources. Conversely, as described above, the disclosed system determines when the crop receiving vehicle is present within the crop unloading zone and automatically moves the discharge opening of the crop unloading tube to a predetermined crop unloading position defined relative to the frame of the harvester. Thus, the fewer computing resources are needed, and the operator can focus on operating other aspects of the harvester.

Referring now to the drawings, FIG. 1 illustrates a partial sectional side view of an agricultural harvester 10 in accordance with aspects of the present subject matter. In general, the harvester 10 is configured to travel across a field in a direction of travel (indicated by arrow 12) to harvest a standing crop 14. While traversing the field, the harvester 10 may be configured to process the harvested crop 16 (FIG. 2) and store the harvested crop 16 within a crop tank 18 of the harvester 10. Furthermore, the harvested crop 16 may be unloaded from the crop tank 18 for receipt by the crop receiving vehicle 20 (FIG. 2) via a crop unloading tube 22 of the harvester 10.

As shown, the harvester 10 is configured as an axial-flow type combine in which the harvested crop 16 is threshed and separated while being advanced by and along a longitudinally arranged rotor 24. However, in alternative embodiments, the harvester 10 may have any other suitable harvester configuration.

The harvester 10 includes a chassis or frame 26 configured to support and/or couple to various components of the harvester 10. For example, in several embodiments, the harvester 10 may include a pair of driven, ground-engaging front wheels 28 and a pair of steerable rear wheels 30 coupled to the frame 26. As such, the wheels 28, 30 support the harvester 10 relative to the ground and move the harvester 10 in the direction of travel 12. Furthermore, the harvester 10 may include an operator's platform 32 having an operator's cab 34, a crop processing system 36, the crop tank 18, and the crop unloading tube 22 that are supported by the frame 26. As will be described below, the crop processing system 36 may be configured to perform various processing operations on the harvested crop 16 as the crop processing system 36 operates to transfer the harvested crop 16 between a harvesting implement 38 (e.g., header) of the harvester 10 and the crop tank 18.

Moreover, as shown in FIG. 1, the harvesting implement 38 and an associated feeder 46 of the crop processing system 36 extend forward of the frame 26 and are pivotably secured thereto for movement in a vertical direction (indicated by arrow 40). In general, the feeder 46 supports the harvesting implement 38. As shown in FIG. 1, the feeder 46 may extend between a front end 48 coupled to the harvesting implement 38 and a rear end 50 positioned adjacent to a threshing and separating assembly 52 of the crop processing system 36. Specifically, the rear end 50 of the feeder 46 may be pivotably coupled to a portion of the harvester 10 to allow the front end 48 of the feeder 46. Thus, the harvesting implement 38 can be moved upward and downward relative to the ground along the vertical direction 40 to set the desired harvesting or cutting height for the harvesting implement 38.

As the harvester 10 is propelled forwardly over the field with the standing crop 14, the crop material is severed from the stubble by a sickle bar 54 at the front of the harvesting implement 38 and delivered by a harvesting implement auger 56 to the front end 48 of the feeder 46. The feeder 46, in turn, supplies the harvested crop 16 to the threshing and separating assembly 52. In several embodiments, the threshing and separating assembly 52 may include a cylindrical chamber 58 in which the rotor 24 is rotated to thresh and separate the harvested crop 16 received therein. That is, the harvested crop 16 is rubbed and beaten between the rotor 24 and the inner surfaces of the chamber 58, whereby the grain, seed, or the like, is loosened and separated from the straw.

The harvested crop 16 that has been separated by the threshing and separating assembly 52 may fall onto a crop cleaning assembly 60 of the crop processing system 36. In general, the crop cleaning assembly 60 may include a series of pans 62 and associated sieves 64. As such, the separated harvested crop 16 may be spread out via oscillation of the pans 62 and/or sieves 64 and may eventually fall through apertures defined in the sieves 64. Additionally, a cleaning fan 66 may be positioned adjacent to one or more of the sieves 64 to provide an air flow through the sieves 64 that remove chaff and other impurities from the harvested crop 16. For instance, the fan 66 may blow the impurities off the harvested crop 16 for discharge from the harvester 10 through the outlet of a straw hood 68 positioned at the back end of the harvester 10. The cleaned harvested crop 16 passing through the sieves 64 may then fall into a trough of an auger 70, which may transfer the harvested crop 16 to an elevator 72 for delivery to the crop tank 18.

Figure 2:
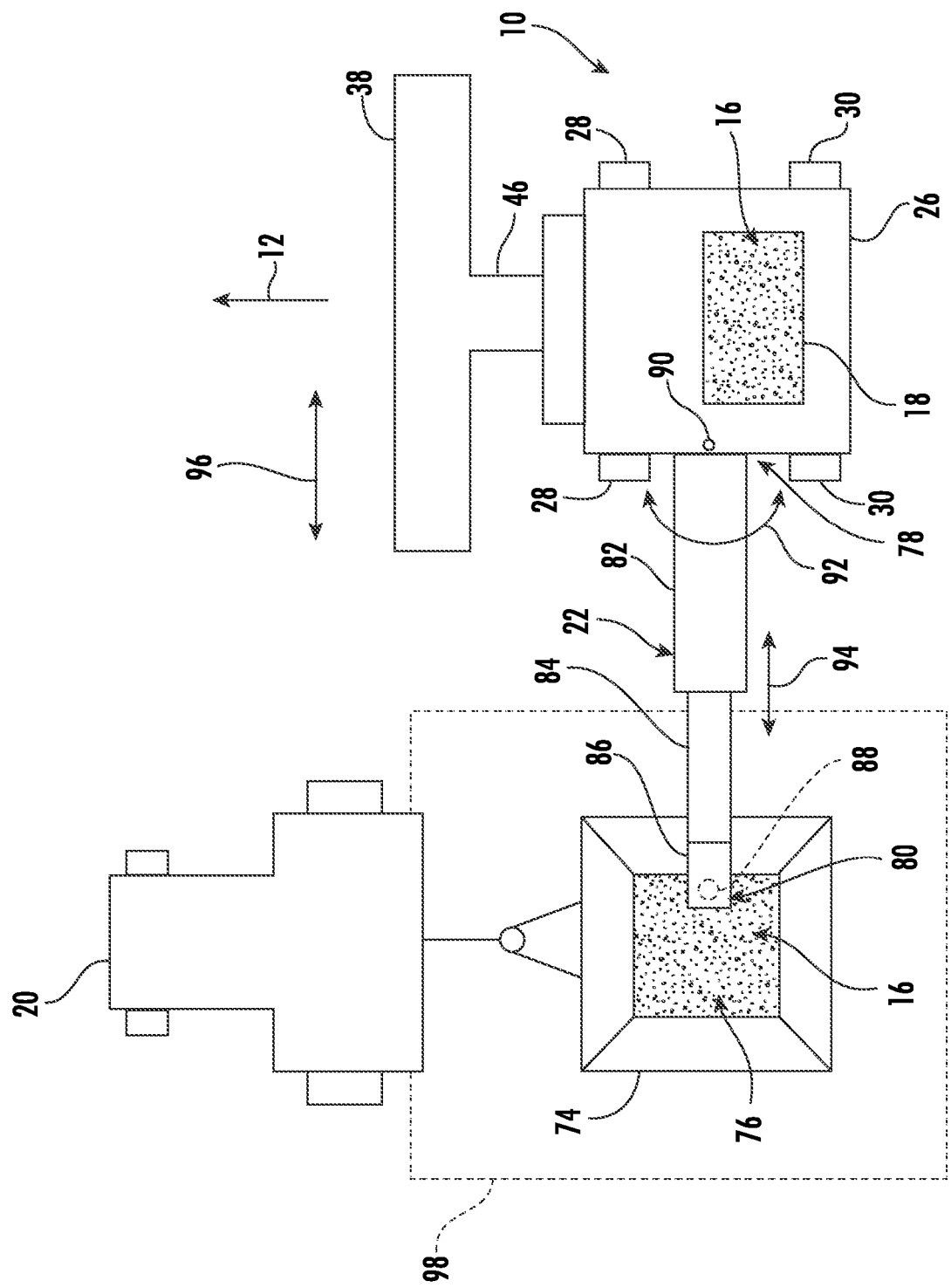
FIG. 2 illustrates a top view of one embodiment of an agricultural harvester unloading harvested crop into a crop receiving vehicle in accordance with aspects of the present subject matter.

Referring now to FIG. 2, a top view of the harvester 10 unloading harvested crop 16 into the associated crop receiving vehicle 20 in accordance with aspects of the present disclosure. As shown, in one embodiment, the crop receiving vehicle 20 may be configured as an agricultural tractor. In such an embodiment, the crop receiving vehicle 20 may include a crop cart 74 defining a crop receiving chamber 76 configured to receive the harvested crop 16 discharged from the crop unloading tube 22 of the harvester 10. However, in other embodiments, the crop receiving vehicle 20 may be configured as any other suitable vehicle capable of receiving harvested crop discharged by the crop unloading tube 22.

In general, the crop unloading tube 22 is configured to move relative to the frame 26 of the harvester 10 to allow the harvested crop 16 to be discharged into the crop receiving chamber 76. Specifically, in several embodiments, the crop unloading tube 22 extends between a proximal end 78 pivotably coupled to the frame 26 of the harvester 10 and a distal end 80 from which the harvested crop 16 is discharged. For example, in one embodiment, the crop unloading tube 22 may include a first tube section 82 positioned at its proximal end 78 and pivotably coupled to the frame 26. Moreover, in such an embodiment, the crop unloading tube 22 may include a second tube section 84 slidably coupled to first tube section 82. Additionally, the crop unloading tube 22 may include a spout 86 defining a discharge opening 88 through which the harvested crop 16 is discharged from the crop unloading tube 22. In this respect, the crop unloading tube 22 may be configured to rotate or swing relative to a pivot point or vertically extending axis 90 on the frame 26 (e.g., as indicated by arrow 92). Thus, the discharge opening 88 can be moved forward and aft relative to the frame 26 along the direction of travel 12. Moreover, the crop unloading tube 22 may be configured to move along the vertical direction 40 (FIG. 1) to raise and/or lower the discharge opening 88 relative to the frame 26 and/or the ground. In addition, the second tube section 84 may be extended and/or retracted relative to the first tube section 82 (e.g., as indicated by arrow 94). As such, the distance between the discharge opening 88 and the frame 26 may be adjusted. However, in alternative embodiments, any other suitable degree of freedom of the crop unloading tube 22 may be adjusted. For example, in one embodiment, the spout 86 may be configured to rotate relative to the second tube section 84.

In several embodiments, the crop unloading tube 22 is moveable between a crop storage position (FIG. 1) and a crop unloading position (FIG. 2). More specifically, as shown in FIG. 1, when at the crop storage position, the crop unloading tube 22 may be positioned relative to the harvester frame 26 such that its distal end 80 is generally positioned aft of the frame 26. Moving the crop unloading tube 22 to the crop storage position makes the harvester 10 narrower in a lateral direction (indicated by arrow 96 and extending perpendicular to the direction of travel 12), thereby making it easier to navigate around obstacles (e.g., trees, building, power lines, etc.). Conversely, when at the crop unloading position, the distal end 80 of the crop unloading tube 22 is positioned outward from the frame 26 in the lateral direction 96 such that the discharge opening 88 is positioned at a suitable location to deposit crops into the crop receiving chamber 76 of the crop cart 74 (or other crop receiving vehicle/implement). In some embodiments, there may be a plurality of predetermined crop unloading positions, with each position corresponding to a particular type, make, model, etc. of crop receiving vehicle.

As will be described below, when the crop receiving vehicle 20 is present in a crop unloading zone (e.g., as indicated by dashed lines 98), the crop unloading tube 22 is automatically moved from its current position (e.g., the crop storage position shown in FIG. 1) to a predetermined crop unloading position (e.g., the crop unloading position shown in FIG. 2). The crop unloading zone 98, in turn, corresponds to a portion of the field adjacent to the harvester 10 in which the crop receiving vehicle 20 (or, more specifically, the crop cart 74) can be positioned close enough the harvester 10 to allow the crop unloading tube 22 to discharge crops into the crop receiving chamber 76. In this respect, when the crop receiving vehicle 20 is present in a crop unloading zone 98, the crop unloading tube 22 may be rotated or swung about the axis 90, raised/lowered, and/or extended/retracted to move the tube 22 to the predetermined crop unloading position.

It should be further appreciated that the configuration of the agricultural harvester 10 described above and shown in FIGS. 1 and 2 is provided only to place the present subject matter in an exemplary field of use. Thus, it should be appreciated that the present subject matter may be readily adaptable to any manner of harvester configuration.

Figure 3:
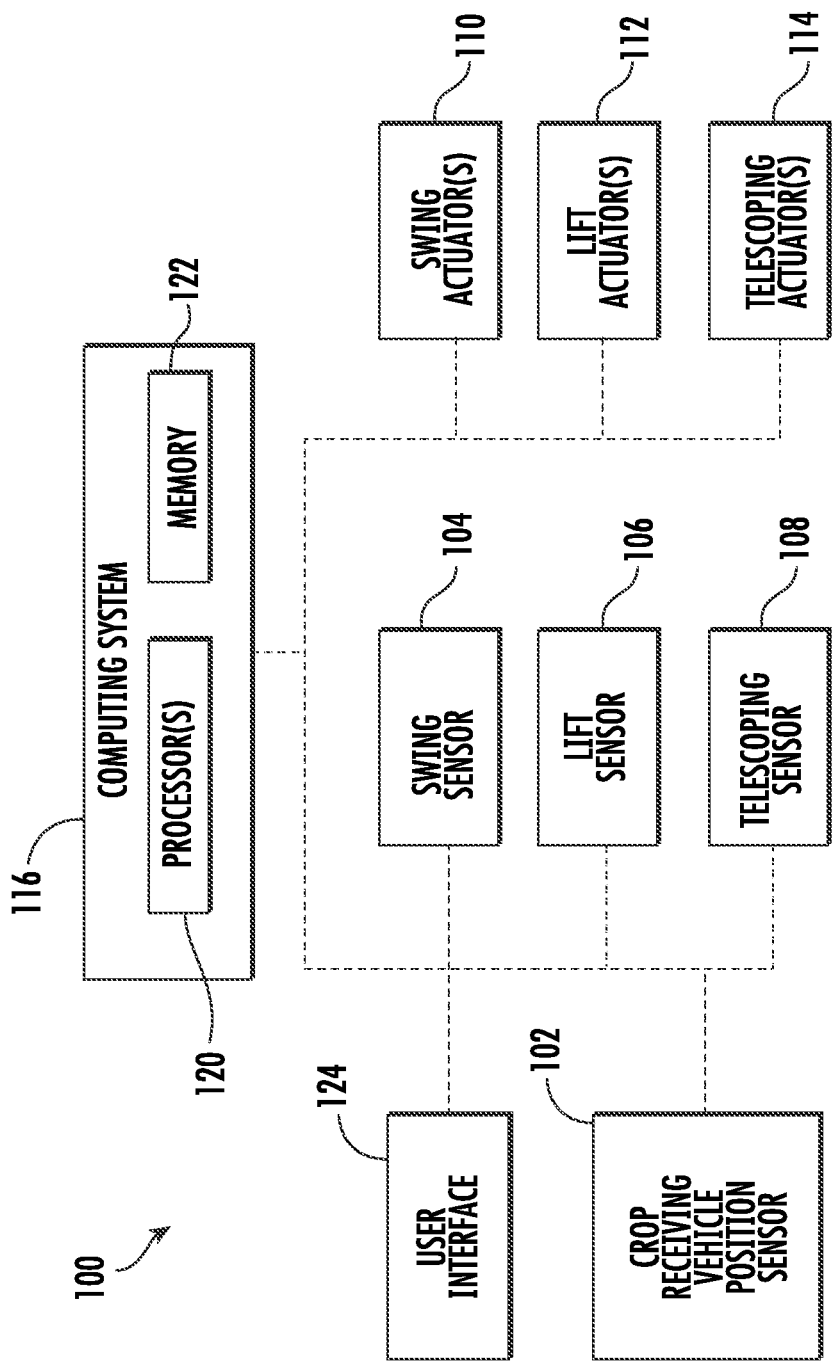
FIG. 3 illustrates a schematic view of one embodiment of a system for controlling crop unloading tube position of an agricultural harvester in accordance with aspects of the present subject matter.

Referring now to FIG. 3, a schematic view of one embodiment of a system 100 for controlling crop unloading tube position of an agricultural harvester is illustrated in accordance with aspects of the present subject matter. In general, the system 100 will be described herein with reference to the agricultural harvester 10 described above with reference to FIGS. 1 and 2. However, it should be appreciated by those of ordinary skill in the art that the disclosed system 100 may generally be utilized with agricultural harvesters having any other suitable harvester configuration.

As shown in FIG. 3, the system 100 includes a crop receiving vehicle presence sensor 102. In general, the crop receiving vehicle presence sensor 102 is configured to capture data indicative of the presence of the crop receiving vehicle 20 (or a portion thereof, such as the crop cart 74) within the crop unloading zone 98 of the agricultural harvester 10. As will be described below, the data captured by the crop receiving vehicle presence sensor 102 may be analyzed to determine when the crop receiving vehicle 20 is present within the crop unloading zone 98 of the harvester 10. Thereafter, when the crop receiving vehicle 20 is present within the crop unloading zone 98, the crop unloading tube 22 may be automatically moved from its current position to a predetermined crop unloading position.

In several embodiments, the crop receiving vehicle presence sensor 102 may correspond to a transceiver-based sensor. In such embodiments, the crop receiving vehicle presence sensor 102 may generally correspond to any suitable sensing device configured to emit output signals for reflection off a surface (e.g., the crop receiving vehicle 20) and receive or sense the return signals. For example, in one such embodiment, the crop receiving vehicle presence sensor 102 may correspond to a radio detection and ranging (RADAR) sensor or a light detection and ranging (LIDAR) sensor. However, in alternative embodiments, the crop receiving vehicle presence sensor 102 may correspond to any other suitable sensor or sensing device, such as an ultrasonic sensor.

Furthermore, the system 100 may include a swing sensor 104. In general, the swing sensor 104 may be configured to capture data indicative of the rotational position of the proximal end 78 of the crop unloading tube 22 about the vertical axis or pivot point 90 (e.g., the swing or rotation of the crop unloading tube 22). As will be described below, the data captured by the swing sensor 104 may be used when moving the crop unloading tube 22 between the crop storage position and the predetermined crop unloading position(s). For example, in one embodiment, the swing sensor 104 may correspond to a rotary potentiometer coupled between the crop unloading tube 22 and the frame 26. However, in alternative embodiments, the swing sensor 104 may correspond to any other suitable sensing device configured to capture data indicative of the rotational position of the crop unloading tube 22.

Additionally, the system 100 may include a lift sensor 106. In general, the lift sensor 106 may be configured to capture data indicative of the position of the distal end 80 of the crop unloading tube 22 along the vertical direction 40. As will be described below, the data captured by the lift sensor 106 may be used when moving the crop unloading tube 22 between the crop storage position and the predetermined crop unloading position(s). For example, in one embodiment, the lift sensor 106 may correspond to a rotary potentiometer coupled between the crop unloading tube 22 and the frame 26. However, in alternative embodiments, the lift sensor 106 may correspond to any other suitable sensing device configured to capture data indicative of the vertical position of the crop unloading tube 22.

Moreover, the system 100 may include a telescoping sensor 108. In general, the telescoping sensor 108 may be configured to capture data indicative of the distance between the discharge opening 88 of the crop unloading tube 22 and the frame 26 (e.g., the extension/retraction of the tube 22). As will be described below, the data captured by the telescoping sensor 108 may be used when moving the crop unloading tube 22 between the crop storage position and the predetermined crop unloading position(s). For example, in one embodiment, the telescoping sensor 108 may correspond to a linear potentiometer coupled between the first and second tube sections 82, 84. However, in alternative embodiments, the telescoping sensor 108 may correspond to any other suitable sensing device configured to capture data indicative of the extension/retraction of the tube 22.

In addition, the system 100 may include one or more actuators configured to adjust one or more degrees of the crop unloading tube 22. In general, by adjusting the degree(s) of freedom of the crop unloading tube 22, the actuator(s) may move the tube 22 between the crop storage position and the predetermined crop unloading position(s). Specifically, in several embodiments, the system 100 may include one or more swing actuators 110. The actuator(s) 110 is, in turn, configured to rotate or swing the crop unloading tube 22 about the vertical axis or pivot point 90 to move the discharge opening 88 forward and/or aft relative to the frame 26. Furthermore, in such embodiments, the system 100 may include one or more lift actuators 112. The actuator(s) 112 is, in turn, configured to raise and/or lower the crop unloading tube 22 relative to the frame 26 along the vertical direction 40. Additionally, in such embodiments, the system 100 may include one or more telescoping actuators 114. The actuator(s) 114 is, in turn, configured to extend and/or retract the second tube section 84 relative to the first tube section 82, thereby increasing or decreasing the distance between the discharge opening 88 of the crop unloading tube 22 and the frame 26. However, in alternative embodiments, the system 100 may include other actuators in addition to and/or in lieu of the actuators 110, 112, 114.

The actuators 110, 112, 114 may correspond to any suitable actuators configured to adjust the associated degrees of freedom of the crop unloading tube 22. For example, in some embodiments, the actuators 110, 112, 114 may correspond to hydraulic cylinders. However, in alternative embodiments, the actuators 110, 112, 114 may correspond to any suitable actuators, such as pneumatic actuators, electric linear actuators, electric motors, and/or the like.

Moreover, the system 100 includes a computing system 116 communicatively coupled to one or more components of the harvester 10 and/or the system 100 to allow the operation of such components to be electronically or automatically controlled by the computing system 116. For instance, the computing system 116 may be communicatively coupled to the sensors 102, 104, 106, 108 via a communicative link 118. As such, the computing system 116 may be configured to receive data from the sensors 102, 104, 106, 108 that is indicative of various operating parameters of the harvester 10. Furthermore, the computing system 116 may be communicatively coupled to the actuators 110, 112, 114 via the communicative link 118. In this respect, the computing system 116 may be configured to control the operation of the actuators 110, 112, 114 to move the crop unloading tube 22 between the crop storage position and the predetermined crop unloading position(s). In addition, the computing system 116 may be communicatively coupled to any other suitable components of the harvester 10 and/or the system 100.

In general, the computing system 116 may comprise one or more processor-based devices, such as a given controller or computing device or any suitable combination of controllers or computing devices. Thus, in several embodiments, the computing system 116 may include one or more processor(s) 120 and associated memory device(s) 122 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 122 of the computing system 116 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 122 may generally be configured to store suitable computer-readable instructions that, when implemented by the processor(s) 120, configure the computing system 116 to perform various computer-implemented functions, such as one or more aspects of the methods and algorithms that will be described herein. In addition, the computing system 116 may also include various other suitable components, such as a communications circuit or module, one or more input/output channels, a data/control bus and/or the like.

The various functions of the computing system 116 may be performed by a single processor-based device or may be distributed across any number of processor-based devices, in which instance such devices may be considered to form part of the computing system 116. For instance, the functions of the computing system 116 may be distributed across multiple application-specific controllers or computing devices, such as a navigation controller, an engine controller, a transmission controller, and/or the like.

In addition, the system 100 may also include a user interface 124. More specifically, the user interface 124 may be configured to receive inputs (e.g., inputs associated with characteristics of the crop receiving vehicle 20) from the operator. As such, the user interface 124 may include one or more input devices, such as touchscreens, keypads, touchpads, knobs, buttons, sliders, switches, mice, microphones, and/or the like, which are configured to receive user inputs from the operator. The user interface 124 may, in turn, be communicatively coupled to the computing system 116 via the communicative link 118 to permit the received inputs to be transmitted from the user interface 124 to the computing system 116. In addition, some embodiments of the user interface 124 may include one or more feedback devices (not shown), such as display screens, speakers, warning lights, and/or the like, which are configured to provide feedback from the computing system 116 to the operator. In one embodiment, the user interface 124 may be mounted or otherwise positioned within the operator's cab 34 of the harvester 10. However, in alternative embodiments, the user interface 124 may mounted at any other suitable location.

Figure 4:
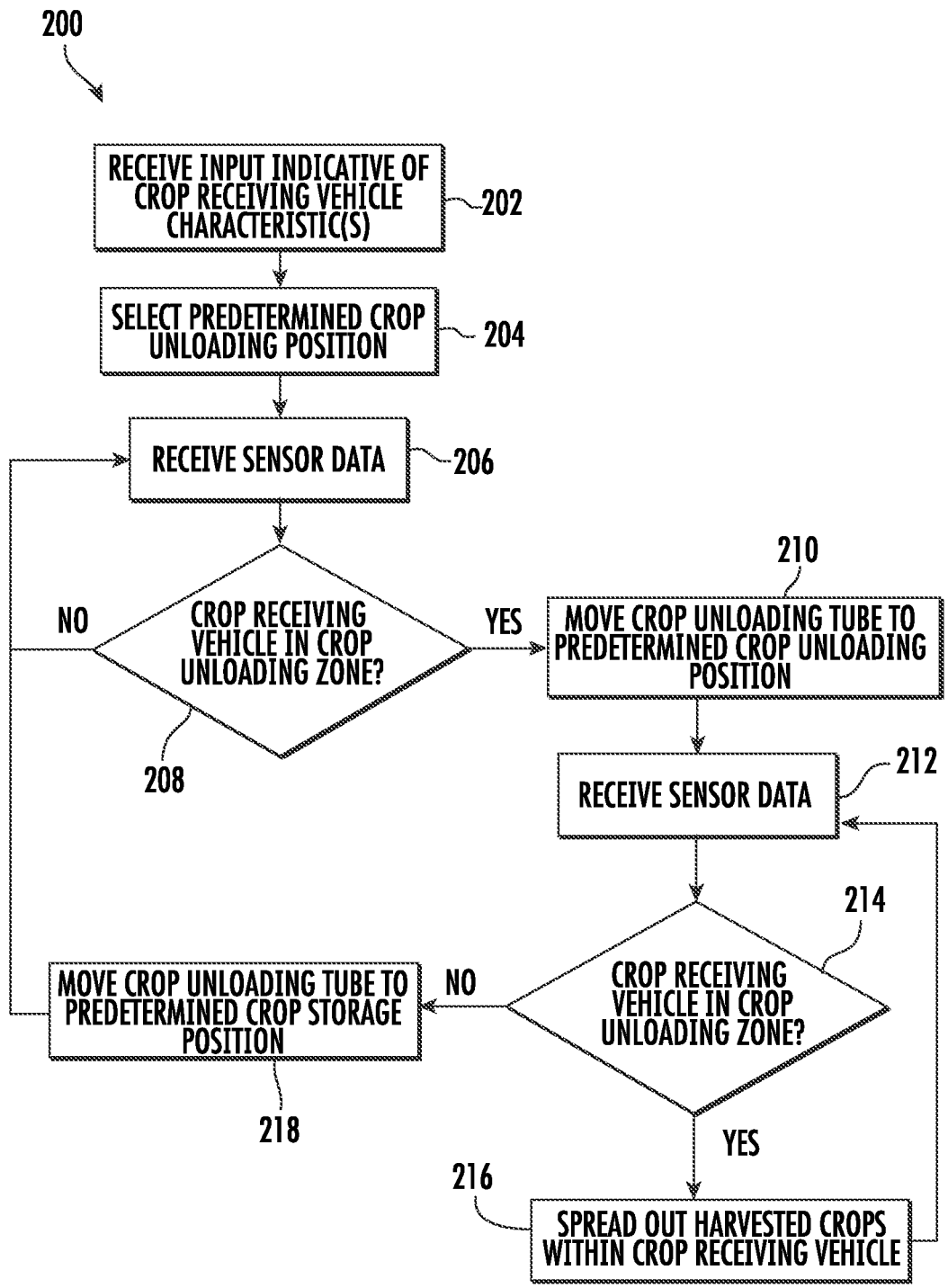
FIG. 4 illustrates a flow diagram providing one embodiment of example control logic for controlling crop unloading tube position of an agricultural harvester in accordance with aspects of the present subject matter.

Referring now to FIG. 4, a flow diagram of one embodiment of example control logic 200 that may be executed by the computing system 116 (or any other suitable computing system) for controlling crop unloading tube position of an agricultural harvester is illustrated in accordance with aspects of the present subject matter. Specifically, the control logic 200 shown in FIG. 4 is representative of steps of one embodiment of an algorithm that can be executed to control the position of the crop unloading tube of an agricultural harvester in a manner that does not require the operator to visually identify the position of the crop receiving vehicle 20 or the use of complex image processing techniques. Thus, in several embodiments, the control logic 200 may be advantageously utilized in association with a system installed on or forming part of an agricultural harvester to allow for real-time crop unloading tube position control without requiring substantial computing resources and/or processing time. However, in other embodiments, the control logic 200 may be used in association with any other suitable system, application, and/or the like for controlling crop unloading tube position of an agricultural harvester.

As shown in FIG. 4, at (202), the control logic 200 includes receiving an input indicative of one or more characteristics of the crop receiving vehicle. Specifically, as mentioned above, in several embodiments, the computing system 116 may be communicatively coupled to the user interface 124 via the communicative link 118. In this respect, the operator may provide one or more inputs to the user interface 124, with such input(s) being indicative of one or more characteristics of the crop receiving vehicle 20. Thereafter, the operator input(s) may be transmitted from the user interface 124 to the computing system 116 via the communicative link 118. Alternatively, the computing system 116 may receive the input(s) from any other suitable device(s), such as a remote computing device(s) (e.g., a Smartphone, a remote database server, etc.) or a sensor(s).

Furthermore, at (204), the control logic 200 includes selecting a predetermined crop unloading position from a plurality of predetermined crop unloading positions based on the characteristic(s) of the crop receiving vehicle. More specifically, the discharge opening 88 of the crop unloading tube 22 may need to be positioned at different locations to discharge harvested crop into the different crop receiving vehicles. For example, the different crop receiving vehicles may have different heights, have different crop receiving chamber sizes, and/or the crop receiving chambers may be located at different locations on the vehicle. Thus, in some embodiments, the computing system 116 may have a plurality of predetermined crop unloading positions stored within its memory device(s) 122. Each stored predetermined crop unloading position may, in turn, correspond to one or more crop receiving vehicles (e.g., based on type, make, model, etc.). In this respect, upon receipt of the input(s) associated with the crop receiving vehicle characteristic(s) at (202), the computing system 116 may select a predetermined crop unloading position from the plurality of stored predetermined crop unloading positions that corresponds to the characteristic(s). For example, the computing system 116 may include a look-up table(s), suitable mathematical formula, and/or algorithms stored within its memory device(s) 122 that correlates the characteristic(s) to the stored predetermined crop unloading positions. As will be described below, when the crop receiving vehicle 20 is present within the crop unloading zone 98 of the harvester 10, the crop unloading tube 22 may automatically be moved to the predetermined crop unloading position selected at (204).

Each predetermined crop unloading position corresponds to a position defined relative to the frame 26 of the harvester 10. As such, each predetermined crop unloading position may have an associated swing angle, vertical height, and/or distance between the frame 26 and the discharge opening 88. In this respect, and as will be described below, the discharge opening 88 of the crop unloading tube 22 may be guided to the selected predetermined crop unloading position based on feedback from sensors (e.g., the sensors 104, 106, 108) associated with various degrees of freedom of the tube 22.

The plurality of stored predetermined crop unloading positions may be provided to the computing system 116 in any suitable manner. For example, in some embodiments, the operator may teach the computing system 116 one or more of the predetermined crop unloading positions by manually moving the crop unloading tube 22 to a position. Thereafter, the operator can provide an input to the user interface 124 instructing the computing system 116 to save that position as one of the predetermined crop unloading positions. The operator also can provide crop receiving vehicle characteristics associated with each taught position. Alternatively, or additionally, the one or more predetermined crop unloading positions may be preset or preprogrammed at the factory.

Additionally, the characteristic(s) received by the computing system 116 at (202) and used at (204) may correspond to any suitable characteristic(s) or parameter(s) that can be used to select a predetermined crop unloading position from the stored predetermined crop unloading positions. For example, suitable characteristics may include the type of crop receiving vehicle (e.g., crop cart being towed by an agricultural tractor, dump truck, semi-trailer, etc.), make, model, and/or the like.

Moreover, at (206), the control logic 200 includes receiving sensor data indicative of the presence of the crop receiving vehicle within a crop unloading zone of the agricultural harvester. Specifically, as mentioned above, in several embodiments, the computing system 116 may be communicatively coupled to the crop receiving vehicle presence sensor 102 via the communicative link 118. In this respect, as the harvester 10 travels across the field to perform a harvesting operation thereon, the computing system 116 may receive data from the crop receiving vehicle presence sensor 102. Such data may, in turn, be indicative of the presence (or lack thereof) of the crop receiving vehicle 20 or the crop cart 74 within the crop unloading zone 98 of the agricultural harvester 10.

In addition, at (208), the control logic 200 includes determining when the crop receiving vehicle is present within the crop unloading zone based on the received sensor data. Specifically, in several embodiments, the computing system 116 may analyze the sensor data received at (206) to determine when the crop cart 74 is present within the crop unloading zone 98 of the harvester 10. For example, the computing system 116 may include a look-up table(s), suitable mathematical formula, and/or algorithms stored within its memory device(s) 122 that correlates the received sensor data to the presence (or lack thereof) of the crop cart 74 within the crop unloading zone 98. When the presence of the crop cart 74 is not detected within the crop unloading zone 98, the control logic 200 returns (206). Conversely, when it is determined that the crop cart 74 is present within the crop unloading zone 98, the crop cart 74 is at a suitable position for harvested crop to be deposited within its crop receiving chamber 76. In such instances, the control logic 200 proceeds to (210).

As shown in FIG. 4, at (210), the control logic 200 includes controlling the operation of the one or more actuators such that the crop unloading tube is moved relative to the frame from its current position to the selected predetermined crop unloading position. Specifically, in several embodiments, the computing system 116 may control the operation of one or more actuators to adjust one or more degrees of the crop unloading tube 22, thereby moving the tube 22 from its current position to the predetermined crop unloading position selected at (204) (e.g., the position shown in FIG. 2). As mentioned above, the computing system 116 may use data received from one or more sensors associated with the degree(s) of freedom to control the operation of the actuator(s). For example, when moving the crop unloading tube 22 to the selected predetermined crop unloading position, the computing system 116 may be configured to control the operation of the swing actuator(s) 110 based on data from the swing sensor 104 to rotate or swing the tube 22 relative to the frame 26 about the vertically extending axis 90. Furthermore, when moving the crop unloading tube 22 to the selected predetermined crop unloading position, the computing system 116 may additionally or alternatively be configured to control the operation of the lift actuator(s) 112 based on data from the lift sensor 106 to raise and/or lower the tube 22 relative to the frame 26 in the vertical direction 40. Moreover, when moving the crop unloading tube 22 to the selected predetermined crop unloading position, the computing system 116 may additionally or alternatively be configured to control the operation of the telescoping actuator(s) 114 based on data from the telescoping sensor 108 to adjust the distance between the discharge opening 88 of the tube 22 and the frame 26. However, in alternative embodiments, the computing system 116 may be configured to control any other suitable actuators to move the crop unloading tube 22 to the selected predetermined crop unloading position in addition to or lieu of the actuators 110, 112, 114.

After the crop unloading tube 22 is moved to the selected predetermined crop unloading position at (210), the control logic 200 includes, at (212), continuing to receive sensor data indicative of the presence of the crop receiving vehicle within the crop unloading zone of the agricultural harvester. As such, (212) is the same as or substantially the same as (206). Thereafter, at (214), the control logic 200 includes determining when the crop receiving vehicle is present within the crop unloading zone based on the received sensor data. Thus, (214) is the same as or substantially the same as (208).

When it is determined at (214) that the crop receiving vehicle is present within the crop unloading zone, the control logic 200 includes, at (216), controlling the operation of the one or more actuators to move a discharge opening defined by the crop unloading tube relative to a crop receiving chamber defined by the crop receiving vehicle such that the harvested crop discharged from the crop unloading tube are spread out within the crop receiving chamber. Specifically, in several embodiments, when harvested crop are being discharged from the crop unloading tube 22, the computing system 116 may control the operation of the actuator(s) to move the discharge opening 88 of the tube 22 relative to the crop receiving chamber 76 of the crop cart 74, thereby more evenly spreading out the harvested crop within the chamber 76. For example, in some embodiments, during unloading, the computing system 116 may control the operation of the swing actuator(s) 110 to move the discharge opening 88 forward and aft (e.g., as indicated by arrow 92 in FIG. 2) to spread out the crops within the crop receiving chamber 76. Additionally, or alternatively, the computing system 116 may control the operation of the telescoping actuator(s) 114 to move the discharge opening 88 toward and away from the frame 26 (e.g., as indicated by arrow 94 in FIG. 2) to spread out the harvested crop within the crop receiving chamber 76. However, in alternative embodiments, the computing system 116 may be configured to control any other suitable actuators to spread out the harvested crop within the crop receiving chamber 76. For example, in one embodiment, the spout 86 may be rotated relative to the second tube segment 84 to further spread out the harvested crop. After a predetermined time has elapsed, the control logic 200 returns to (212) to allow a subsequent determination of whether the crop receiving vehicle is present within the crop unloading zone.

Conversely, when it is determined at (214) that the crop receiving vehicle is present within the crop unloading zone, the control logic 200 includes, at (218), controlling the operation of the one or more actuators such that the crop unloading tube is moved relative to the frame from the predetermined crop unloading position to a crop storage position. Specifically, in several embodiments, the computing system 116 may control the operation of one or more actuators (e.g., the actuators 110, 112, 114) to adjust one or more degrees of freedom of the crop unloading tube 22, thereby moving the tube 22 from the current predetermined crop unloading position to the crop storage position (e.g., the position shown in FIG. 1). As mentioned above, the computing system 116 may use data received from one or more sensors associated with the degree(s) of freedom (e.g., the sensors 104, 106, 108) to control the operation of the actuator(s). Thereafter, the control logic 200 returns (206).

Figure 5:
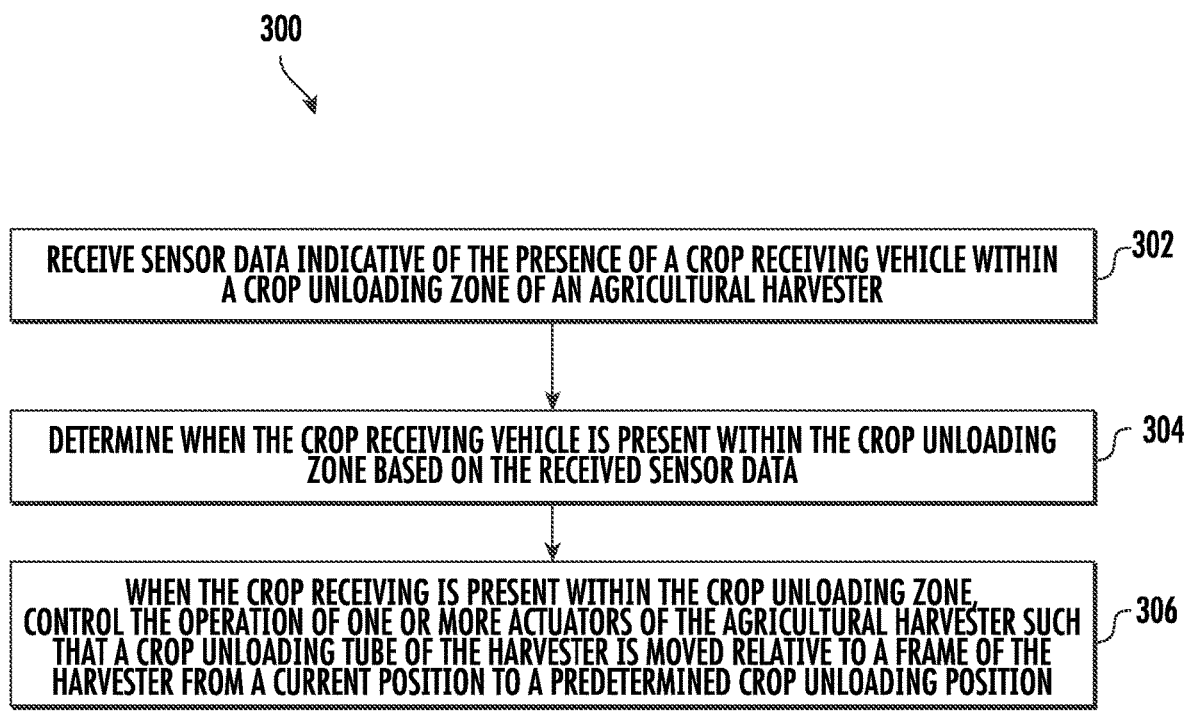
FIG. 5 illustrates a flow diagram of one embodiment of a method for controlling crop unloading tube position of an agricultural harvester in accordance with aspects of the present subject matter.

Referring now to FIG. 5, a flow diagram of one embodiment of a method 300 for controlling crop unloading tube position of an agricultural harvester is illustrated in accordance with aspects of the present subject matter. In general, the method 300 will be described herein with reference to the agricultural harvester 10 and the system 100 described above with reference to FIGS. 1-4. However, it should be appreciated by those of ordinary skill in the art that the disclosed method 300 may generally be implemented with any agricultural harvester having any suitable harvester configuration and/or any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (302), the method 300 may include receiving, with a computing system, sensor data indicative of the presence of a crop receiving vehicle within a crop unloading zone of an agricultural harvester. For instance, as described above, during operation of the harvester 10, the computing system 116 may be configured to receive data from the crop receiving vehicle presence sensor 102. The crop receiving vehicle presence sensor 102 may, in turn, capture data indicative of the presence of the crop receiving vehicle 20 (or a portion thereof, such as the crop cart 74) within the crop unloading zone 98 of the agricultural harvester 10.

Additionally, at (304), the method 300 may include determining, with the computing system, when the crop receiving vehicle is present within the crop unloading zone based on the received sensor data. For instance, as described above, the computing system 116 may be configured to determine when the crop receiving vehicle 20 is present within the crop unloading zone 98 based on the data received from the crop receiving vehicle presence sensor 102.

Moreover, at (306), when the crop receiving vehicle is present within the crop unloading zone, the method 300 may include controlling, with the computing system, the operation of one or more actuators of the agricultural harvester such that a crop unloading tube of the harvester is moved relative to a frame of the harvester from a current position to a predetermined crop unloading position. For instance, as described above, when the crop receiving vehicle 20 is present within the crop unloading zone 98, the computing system 116 may be configured to control the operation of actuators 110, 112, 114 such that the crop unloading tube 22 is moved relative to the frame 26 from its current position to a predetermined crop unloading position.

I It is to be understood that the steps of the control logic 200 and the method 300 are performed by the computing system 116 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 116 described herein, such as the control logic 200 and the method 300, is implemented in software code or instructions which are tangibly stored on a tangible computer readable medium. The computing system 116 loads the software code or instructions via a direct interface with the computer readable medium or via a wired and/or wireless network. Upon loading and executing such software code or instructions by the computing system 116, the computing system 116 may perform any of the functionality of the computing system 116 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural harvester, comprising:
a frame;
a crop unloading tube coupled to the frame, the crop unloading tube configured to discharge harvested crop from the agricultural harvester into a crop receiving vehicle, the crop receiving vehicle including a crop cart defining a crop receiving chamber configured to receive the harvested crop from the crop unloading tube;
one or more actuators configured to move the crop unloading tube relative to the frame;
a sensor configured to capture data indicative of a presence of the crop receiving vehicle within a crop unloading zone that is a portion of the field adjacent to the agricultural harvester in which the crop receiving vehicle is positionable; and a computing system communicatively coupled to the sensor, wherein the computing system:

determines when the crop receiving vehicle is present within the crop unloading zone based on the data captured by the sensor; and when it is determined that the crop receiving vehicle is present within the crop unloading zone, controls an operation of the one or more actuators such that the crop unloading tube is moved relative to the frame from a crop storage position to a predetermined crop unloading position relative to the frame.

2. The agricultural harvester of claim 1, wherein the sensor comprises a transceiver-based sensor.

3. The agricultural harvester of claim 2, wherein the sensor comprises a RADAR sensor or a LIDAR sensor.

4. The agricultural harvester of claim 1, wherein the one or more actuators are configured to rotate the crop unloading tube relative to the frame about a vertically extending axis of the agricultural harvester, move the crop unloading tube relative to the frame in a vertical direction, and adjust a distance between a discharge opening defined by the crop unloading tube and the frame when moving the crop unloading tube to the predetermined crop unloading position.

5. A system for controlling crop unloading tube position of an agricultural harvester, the system comprising:

a frame;

a crop unloading tube coupled to the frame, the crop unloading tube configured to discharge harvested crop from the agricultural harvester into a crop receiving vehicle, the crop receiving vehicle including a crop cart defining a crop receiving chamber configured to receive the harvested crop from the crop unloading tube;

one or more actuators configured to move the crop unloading tube relative to the frame;

a sensor configured to capture data indicative of a presence of the crop receiving vehicle within a crop unloading zone that is a portion of the field adjacent to the agricultural harvester in which the crop receiving vehicle is positionable; and a computing system communicatively coupled to the sensor, wherein the computing system:

determines when the crop receiving vehicle is present within the crop unloading zone based on the data captured by the sensor; and when it is determined that the crop receiving vehicle is present within the crop unloading zone, controls an operation of the one or more actuators such that the crop unloading tube is moved relative to the frame from a crop storage position to a predetermined crop unloading position relative to the frame.

6. The system of claim 5, wherein, after the crop unloading tube is moved to the predetermined crop unloading position, the computing system further:

determines when the crop receiving vehicle is not present within the crop unloading zone based on the data captured by the sensor; and when it is determined that the crop receiving vehicle is not present within crop unloading zone, controls the operation of the one or more actuators such that the crop unloading tube is moved relative to the frame from the predetermined crop unloading position to a crop storage position.

7. The system of claim 5, wherein the computing system further:

receives an input indicative of a characteristic of the crop receiving vehicle; and selects the predetermined crop unloading position relative to the frame from a plurality of predetermined crop unloading positions relative to the frame based on the characteristic of the crop receiving vehicle.

8. The system of claim 7, further comprising:

a user interface configured to receive the input from an operator of the agricultural harvester, wherein the input is indicative of the characteristic of the crop receiving vehicle from the user interface.

9. The system of claim 5, wherein the predetermined crop unloading position is set by an operator of the agricultural harvester.

10. The system of claim 5, wherein, after the crop unloading tube is moved to the predetermined crop unloading position, the computing system further controls the operation of the one or more actuators to move a discharge opening defined by the crop unloading tube relative to the crop receiving chamber defined by the crop cart of the crop receiving vehicle such that the harvested crop discharged from the crop unloading tube is spread out within the crop receiving chamber.

11. The system of claim 5, wherein the sensor comprises a transceiver-based sensor.

12. The system of claim 11, wherein the sensor comprises a RADAR sensor or a LIDAR sensor.

13. The system of claim 5, wherein the one or more actuators are configured to rotate the crop unloading tube relative to the frame about a vertically extending axis of the agricultural harvester when moving the crop unloading tube to the predetermined crop unloading position.

14. The system of claim 5, wherein the one or more actuators are configured to move the crop unloading tube relative to the frame in a vertical direction when moving the crop unloading tube to the predetermined crop unloading position.

15. The system of claim 5, wherein the one or more actuators are configured to adjust a distance between a discharge opening defined by the crop unloading tube and the frame when moving the crop unloading tube to the predetermined crop unloading position.

16. A method for controlling crop unloading tube position of an agricultural harvester, the agricultural harvester including a frame, a crop unloading tube, and one or more actuators configured to move the crop unloading tube relative to the frame, the method comprising:

receiving, with a computing system, sensor data indicative of a presence of a crop receiving vehicle, the crop receiving vehicle including a crop cart defining a crop receiving chamber, within a crop unloading zone that is a portion of the field adjacent to the agricultural harvester in which the crop receiving vehicle is positionable;

determining, with the computing system, when the crop receiving vehicle is present within the crop unloading zone based on the received sensor data; and when the crop receiving vehicle is present within the crop unloading zone, controlling, with the computing system, an operation of the one or more actuators such that the crop unloading tube is moved relative to the frame from a crop storage position to a predetermined crop unloading position relative to the frame.

17. The method of claim 16, further comprising:
after the crop unloading tube is moved to the predetermined crop unloading position, determining, with the computing system, when the crop receiving vehicle is not present within the crop unloading zone based on the received sensor data; and
when it is determined that the crop receiving vehicle is not present within the crop unloading zone, controlling, with the computing system, the operation of the one or more actuators such that the crop unloading tube is moved relative to the frame from the predetermined crop unloading position to a crop storage position.

18. The method of claim 16, further comprising:
receiving, with the computing system, an input indicative of a characteristic of the crop receiving vehicle; and
selecting, with the computing system, the predetermined crop unloading position relative to the frame from a plurality of predetermined crop unloading positions relative to the frame based on the characteristic of the crop receiving vehicle.

19. The method of claim 16, further comprising:
after the crop unloading tube is moved to the predetermined crop unloading position, controlling, with the computing system, the operation of the one or more actuators to move a discharge opening defined by the crop unloading tube relative to the crop receiving chamber defined by the crop cart of the crop receiving vehicle such that the harvested crop discharged from the crop unloading tube is spread out within the crop receiving chamber.

20. The method of claim 16, wherein controlling the operation of the one or more actuators comprises controlling, with the computing system, the operation of the one or more actuators such that a distance between a discharge opening defined by the crop unloading tube and the frame is adjusted.

* * * * *